…

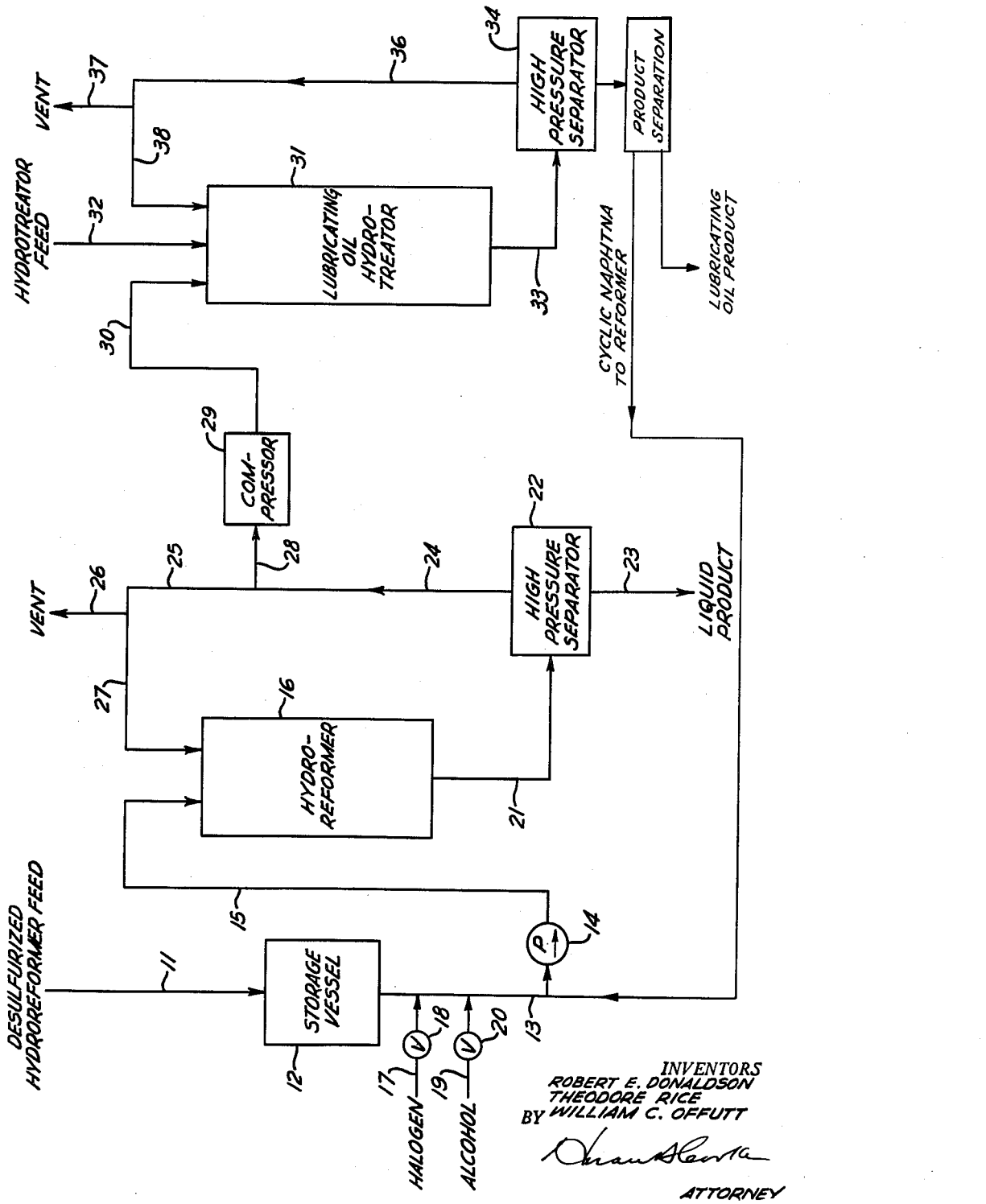

3,062,735
COMBINED PROCESSES OF REFORMING AND LUBRICATING OIL HYDROGENATION

Robert E. Donaldson, Penn Hills Township, Allegheny County, William C. Offutt, Pittsburgh, and Theodore Rice, Penn Hills Township, Allegheny County, Pa., assignors to Gulf Research & Development Company, Pittsburgh, Pa., a corporation of Delaware
Filed Dec. 14, 1959, Ser. No. 859,362
6 Claims. (Cl. 208—57)

This invention relates to the catalytic hydrogenation of lubricating oil stocks and more particularly this invention relates to the catalytic hydrogenation of lubricating oil stocks in the presence of injected halogen.

Compositions containing sulfided metals of group VIII and the left hand column of group VI supported upon a carrier material possessing catalytic cracking activity are active catalysts for the hydrogenative upgrading of lubricating oil stocks. When the supporting material which is employed in such catalysts possesses a relatively high degree of cracking activity, as specified below, halogen treatment of these catalysts results in greater activity for the improvement of viscosity index of lubricating oil stocks during hydrotreating.

While these catalysts can be halogenated prior to being placed onstream in a lubricating oil hydrotreating process, after an extended period onstream these catalysts tend to lose their halogen content and require halogen injection into the hydrotreating reactor to compensate for this loss. Moreover, from the point of view of product quality it is highly desirable that halogen injection into the reactor be employed from the outset as the means of halogen promotion.

An especially great improvement in the activity of sulfided group VIII and left hand column group VI metals supported upon a carrier material possessing a relatively high degree of cracking activity as described below is achieved by continuously injecting a halogen or a halogen containing substance into the reaction system during the hydrotreatment of a lubricating oil stock. The improvement in catalyst activity realized by injection of a halogen or a halogen containing compound into the reaction system during the hydrotreatment of a lubricating oil stock when employing the catalysts described herein results in a lubricating oil product having a substantially higher viscosity index than can be achieved by halogenating the catalyst prior to placing it onstream.

Although the catalyst can be halogenated before being placed onstream in a reactor for the hydrogenative upgrading of a lubricating oil stock, the viscosity index of the lubricating oil product is not as high when such a catalyst is employed in the absence of halogen injection as compared to the viscosity index of a lubricating oil product achievable by continuous injection of a halogen or halogen containing material during the hydrotreatment operation. The maximum improvement in catalyst activity that can be achieved by pretreating the catalyst with halogen is achieved when a relatively small amount of halogen is added to the catalyst and no further improvement is achieved by adding an excess of halogen to the catalyst by pretreating. For example, the maximum increase in catalyst activity for the improvement of viscosity index of a lubricating oil product is achieved when about 0.3 percent by weight of fluorine is added to the catalyst and no increase in catalyst activity for the improvement of viscosity index of a lubricating oil stock is achieved by pretreating the catalyst with a greater amount of fluorine. On the other hand, the continuous injection of halogen into the reactor results in a lubricating oil product having a higher viscosity index than can be achieved by pretreatment of the catalyst with any amount of fluorine.

While it is especially advantageous to continuously inject halogen, there are considerable problems associated with the injection of halogens or halogen componds into a lubricating oil hydrotreating reaction system. The injection of a halogen containing stream directly into the hydrotreating reactor is highly impractical and difficult since the reactor is commonly operated at a pressure of about 3500 pounds per square inch gauge and at this pressure the operation of an injection pump would be extremely difficult because of failure of injection pump packings, etc. Also, operating difficulties in metering a halogen injection stream at this pressure would be prohibitive since rotometers would explode and an orifice plate would quickly succumb to excessive corrosion in the presence of halogen under such severe conditions.

Injection of halogen into the hydrogen gas charge line would meet with similar difficulties since hydrogen employed in hydrotreatment operations is usually available only at relatively high pressures, i.e., 500–1000 pounds per square inch gauge.

The hydrocarbon charge feed tank is the only remaining avenue by which halogen can be injected into the system. The injection of halogen into the hydrotreating system via the hydrotreater charge oil feed tank avoids the difficulties inherent in halogen injection into the reactor or hydrogen feed lines since injection at this point would be an atmospheric pressure operation and therefore the halogen could even be injected into the oil by simple gravity flow. However, it has been found to be extremely difficult to dissolve halogen into the charge oil for the hydrotreating unit since this oil is necessarily of a high viscosity since the viscosity of the oil charge to a lubricating oil hydrotreater must be greater than that of the lubricating oil it is desired to produce during the hydrotreating process. The high viscosity of this oil is indicated by the fact that the oil charge to a lubricating oil hydrotreater boils in the region from 800° F. to above 1000° F. Because of the high viscosity of this charge oil, elemental halogen or inorganic acids, such as hydrogen chloride or hydrogen fluoride, cannot readily be dissolved in sufficient quantity to continuously satisfy the halogen requirement of the reactor system. It is highly disadvantageous to allow halogen which is not dissolved in the charge oil to enter the hydrotreating reactor since this halogen will enter the reactor in slugs whereby one zone of the reactor will be overhalogenated resulting in overprocessing of the reactants in that zone while another zone of the reactor will be deprived of any halogen resulting in possible underprocessing of reactants in that zone. In order to accomplish the solution of any reasonable amount of halogen in this highly viscous oil it is necessary to dissolve the halogen as an aromatic organic halide but such compounds are considerably more expensive than aliphatic organic halides and even these compounds are difficulty soluble in the heavy oil.

We have now discovered a novel and advantageous means for accomplishing the continuous admission of halogen to a lubricating oil hydrotreating reactor without incurring any additional process steps and without installing additional equipment but rather by advantageously employing a halogen injection system which is already in operation at another process. During operation of hydroreforming processes large quantities of hydrogen are produced by such reactions as dehydrocyclization, hydrocracking and dehydrogenation and this hydrogen is available to nearby processes which consume hydrogen. Hydroreforming processes commonly employ catalysts containing halogen, such as chlorine or to a lesser extent fluorine, and these catalysts tend to lose their halogen content due to the presence of traces of water in the reactor which tends to leach halogen, especially chlorine, from the catalyst. To compensate for this loss, hydroreforming units commonly employ halogen injection. Halogen, for example as an aliphatic organic halide, can be added to the hydrocarbon charge stock to a hydroreformer since this hydrocarbon is relatively light oil such as a naphtha fraction boiling in the 175°–400° F. range and considerably lower in viscosity than the oil feed to a lubricating oil hydrotreating unit. Aliphatic halides upon addition to the charge oil of a hydroreformer readily dissolve, enter into the hydroreforming reactor and deposit upon the catalyst to replace halogen previously lost by the catalyst.

In accordance with this invention, an amount of halogen, preferably chlorine, which is adequate to supply the needs of not only the hydroreformer unit itself but also sufficient to supply the needs of an associated lubricating oil hydrotreating unit is added to a hydroreformer charge. This halogen can be added to the hydroreformer feed storage tank or preferably, to achieve better control, is injected into a flowing stream of the hydroreformer feed at a suitable point such as at the suction of the pump at the bottom of the hydroreformer feed storage tank. The halogen injection rate is controlled by any suitable means such as by adjustment of a valve in a gravity flow injection system or by adjusting the stroke of a proportioning injection pump.

The halogen added to the hydroreformer unit tends to deposit upon the hydroreformer catalyst and advantageously activates this catalyst. The necessary quantity of halogen for use in the hydrotreater is leached from the hydroreformer catalyst by injection into the hydroreformer of controlled quantities of a compound which forms water under hydroreformer conditions, such as a low molecular weight alcohol, for example tertiary butyl alcohol. The use of a water forming compound rather than water itself is necessary since water will not dissolve in the hydrocarbon feed. The water formed in the hydroreformer tends to leach halogen, especially chlorine, from the hydroreformer catalyst which halogen thereupon enters the hydrogen off-gas stream, a portion of which is continually charged to the hydrotreater. If the hydroreformer catalyst is excessively depleted of halogen in this manner, an increased flow of fresh halogen is injected into the hydroreformer hydrocarbon charge stream. Therefore, the quantity of halogen upon the hydroreformer catalyst and the quantity of halogen in the hydroreformer off-gas stream is controlled by regulating the amount of halogen added to the hydroreformer and by adjusting the ratio of water forming compound to halogen charged to the hydroreformer. An increased flow of halogen to the hydrotreater is achieved by increasing the flow of water forming compound to the hydroreformer while a decreased flow of halogen to the hydrotreater is achieved by decreasing the flow of water forming compound to the hydroreformer.

In this manner a single halogen injection facility is employed to supply halogen to both a hydroreformer process and a lubricating oil hydrotreating process and thereby continuous halogen addition to a lubricating oil hydrotreating process is accomplished by advantageously dissolving halogen compounds in the hydroreformer charge oil that would not dissolve in the charge oil feed to the lubricating oil hydrotreater itself.

In order for the halogen transfer rate from the hydroreformer to the hydrotreater to be regulated by controlled injection of a water forming compound to the hydroreformer it is necessary that the hydrocarbon charge to the hydroreformer be pretreated for the removal of deleterious substances such as sulfur. In the absence of such pretreatment, under hydroreforming conditions sulfur containing compounds are converted to hydrogen sulfide and it is necessary to scrub this from the hydroreformer recycle gas stream. Such a scrubbing operation is generally accomplished with an aqueous solution, for example an aqueous amine solution, and in this manner an uncontrolled source of water finds access to the hydroreformer. On the other hand, pretreatment of the hydrocarbon charge to the hydroreformer, for example in the presence of hydrogen with a catalyst comprising nickel-cobalt-molybdenum on alumina under pretreating conditions, results in the conversion of sulfur contaminants to hydrogen sulfide as well as the conversion of oxygenated compounds to water which compounds are stripped from the pretreater effluent and only the purified hydrocarbon is passed to the hydroreformer. Such treatment is commonly referred to as hydrodesulfurization and when such a desulfurized hydrocarbon is charged to the hydroreformer uncontrolled access of water to the hydroreformer is thereby avoided.

The process of this invention comprises contacting a sulfided catalyst comprising a metal of the left hand column of group VI and a group VIII metal supported upon a carrier material having an activity for cracking corresponding to a rating of at least 12 and preferably at least 40 on the Kellogg activity scale defined below with a stream of liquid deasphalted hydrocarbon charge oil which is heavier than the lubricating oil to be produced in admixture with a stream of hydrogen under hydrotreating conditions of temperature, pressure and hydrogen-charge ratio, said hydrogen produced in a hydroreforming process to which halogen and water are continuously added, the amount of halogen added to the hydroreforming process being at least sufficient for halogen promotion of both the hydroreforming process and the hydrotreating process, recovering an effluent from said hydrotreatment and separating a high quality lubricating oil fraction from said effluent. The carrier material of the catalyst which is employed preferably has a cracking activity corresponding to a rating of at least 40 on the Kellogg activity scale defined below since catalysts having supports of lower cracking activity are not improved by the presence of halogen in respect to activity for the improvement of viscosity index of the lubricating oil product, although they are improved by the presence of halogen in respect to activity for the lowering of iodine number.

The amount of halogen to be continuously added to the hydroreformer unit in accordance with this invention will depend largely upon the quantity of oil being processed in the hydrotreater unit. Generally, the lubricating oil hydrotreating process requires between about 1 and 10 parts per million by weight of elemental halogen based upon the hydrocarbon charge to the hydrotreater. In order to supply the lubricating oil hydrotreating process with between about 1 and 10 parts per million by weight of elemental halogen based upon the hydrocarbon charge to that process it is necessary that the hydroreformer hydrogen off-gas being fed to the hydrotreater contains an equivalent amount of halogen. Since the amount of hydroreformer hydrogen off-gas being fed to the hydrotreater may vary between 400 and 1500 standard cubic feet of make-up gas per barrel of hydrocarbon charge to the hydrotreater the amount of elemental halogen required in the hydroreformer off-gas may vary between 10 and 500 parts per million by weight based on the hydroreformer off-gas.

When the halogen employed is chlorine 1 part per million of chlorine based on hydroreformer hydrocarbon charge will be equivalent to 2 to 10 parts per million by weight of chlorine in the hydroreformer hydrogen off-gas. In order to maintain the chloride content of the hydroreformer catalyst constant it is necessary to add between 20 and 30 parts per million by weight of water based on hydroreformer charge per 1 part per million of chlorine based on the hydroreformer charge.

As shown in the drawing desulfurized hydroreformer charge is fed through line 11 to storage vessel 12 from which it is passed through line 13, pump 14 and line 15 to hydroreformer 16. Halogen is injected into pump suction line 13 through line 17 and control valve 18 while a low molecular weight alcohol which is converted into water under hydroreformer conditions is injected into pump suction line 13 through line 19 and control valve 20. The reaction products from hydroformer 16 pass through line 21 to high pressure separator 22 from which a liquid product is removed through line 23 and from which a mixture comprising hydroreformer hydrogen off-gas and halogen is removed through line 24. A portion of the hydroreformer hydrogen off-gas stream is recycled to hydroreformer 16 through lines 25 and 27, while excess hydrogen is vented through line 26. Another portion of the hydroreformer hydrogen off-gas stream is passed through line 28, compressor 29 and line 30 to lubricating oil hydrotreater 31. The halogen content in the hydrogen stream to the hydrotreater is regulated by adjustment of the openings of valves 18 and 20. Hydrocarbon feed is charged to hydrotreater 31 through line 32 while hydrotreater effluent is removed through line 33 and passed to high pressure separator 34 from which liquid product is removed through line 35. Hydrogen containing gas is removed from high pressure separator 34 through line 36 and recycled to hydrotreater 31 through line 38 while a portion of this stream is vented through line 37.

In accordance with a preferred embodiment of this invention the hydroreformer is operated with a charge stock whose selectivity is relatively unaffected by the presence of excessive amounts of water vapor. The presence of relatively high proportions of water in the hydroreformer has no deleterious effect on catalyst selectivity when employing naphthenic stocks comprising at least 40 percent by volume of cyclic compounds and preferably about 50 percent by volume of cyclic compounds. One by-product of the hydrotreater is a naphtha fraction having such a cyclic content and this fraction can be separated from the hydrotreater effluent and either employed as the hydroreformer charge or blended with another hydrocarbon stream of lower cyclic content to produce a resulting mixture having the desired cyclic content. The interdependence and cooperative effect of this arrangement is seen by the fact that a highly naphthenic charge to the hydroreforming is beneficial to both units since it results in a hydroreformer product of high octane number and in high purity of hydroreformer hydrogen off-gas, which is advantageously employed in the hydrotreater.

In one embodiment wherein a hydroreformer and a lubricating oil hydrotreater are operated interdependently in accordance with the method of this invention the process comprises adding halogen to a desulfurized hydroreformer hydrocarbon charge in an amount sufficient for activation of the hydroreformer catalyst and the hydrotreater catalyst, adding to the hydroreformer hydrocarbon charge a substance which forms water under the conditions of the hydroreformer, contacting said hydroreformer hydrocarbon charge, halogen and water forming substance and hydrogen with a hydroreformer catalyst, recovering an effluent from said hydroreformer and separating a gaseous hydrogen containing stream from said effluent, adjusting the rate of addition of said water forming substance to regulate the halogen content of said hydrogen containing stream, contacting at least a portion of said hydrogen containing stream together with a lubricating oil hydrotreater hydrocarbon charge with a hydrotreater catalyst comprising a sulfided metal of the left hand column of group VI and a sulfided group VIII metal supported upon a carrier material having an activity for cracking corresponding to a rating of at least 12 and preferably 40 on the Kellogg activity scale under hydrotreating conditions of temperature and pressure, recovering an effluent from said hydrotreater and separating a lubricating oil fraction from said hydrotreater effluent.

In one preferred embodiment the hydroreformer hydrocarbon charge stock comprises at least 40 percent by volume of cyclic compounds. In still another embodiment at least a portion of the hydroreformer hydrocarbon charge comprises a fraction of the hydrotreater hydrocarbon effluent boiling below the lubricating oil range and preferably boiling within the naphtha range which contains at least 40 percent by volume of cyclics. The preferred halogen to be employed in the process of this invention is chlorine.

Any suitable reforming catalyst can be employed in the hydroreforming process such as, for example, platinum or palladium on alumina. Suitable hydroreforming temperatures range from 850° to 1100° F. and suitable hydroreforming pressures range from 50 to 1000 pounds per square inch gauge. The hydroreforming process can be carried out at space velocities between 0.5 and 5 liquid volumes of charge per volume of catalyst per hour. A high hydrogen to hydrocarbon mole ratio, preferably at least 10:1, should be maintained in order to accomplish a high hydrogen partial pressure which is necessary for the maintenance of the hydroreformer catalyst in a relatively carbon free condition. Such a mole ratio is maintained by continuously recycling a portion of the hydroreformer off-gas.

The hydrotreater catalyst compositions of this invention comprise sulfided supported group VIII and left hand column group VI metals wherein the carrier material possesses a relatively high degree of cracking activity as specified below. The catalyst can be pretreated with a halogen, such as fluorine, and can contain up to 2.5 percent by weight or more of fluorine. Examples of suitable metals of the left hand column of group VI are chromium, molybdenum and tungsten, and examples of suitable group VIII metals are iron, cobalt and nickel. Preferably the left hand column group VI metal is tungsten and preferably the group VIII metal is nickel.

The amount of group VIII plus left hand column group VI metals present in the hydrotreater catalyst should be 5 percent to 40 percent of the total catalyst weight, expressed as pure metals. Preferably, the group VIII and the left hand column group VI metals present should comprise 10 percent to 25 percent of the total catalyst weight. The atomic ratio of the left hand column group VI metal to the group VIII metal should be between 1 atom of left hand column group VI metal to 0.1 atom of group VIII metal and 1 atom of left hand column group VI metal to 5 atoms of group VIII metal, generally, but is preferably within the range of 1 atom of left hand column group VI metal to 0.3 atom of group VIII metal and 1 atom of left hand column group VI metal to 4 atoms of group VIII metal.

The group VIII and the left hand column group VI metals of the hydrotreater catalyst are present in some form of combination or mixture with sulfur. The amount of sulfur present on the hydrotreater catalyst is preferably between 0.5 percent and 23 percent of the catalyst weight. More preferably, the amount of sulfur on the catalyst is equivalent to that amount of sulfur necessary to convert at least 35 percent of the active metals to their sulfides and, most preferably, the amount of sulfur on the catalyst is equivalent to that amount of sulfur necessary to convert between about 50 and 63 percent of the active metals to their sulfides.

In order to be beneficiated by halogen promotion in respect to improvement in activity for the increase of viscosity index of a lubricating oil the carrier material for the hydrotreater catalyst must possess a relatively high degree of cracking activity and the degree of cracking activity can be conveniently defined by relating it to the Kellogg cracking activity scale, developed by The M. W. Kellogg Company. This scale defines cracking activity as percent by volume of conversion obtained by passing a standard charge stock through the catalyst under standard test conditions. The Kellogg cracking activity scale is explained in "Physical, Chemical and Catalytic Testing of Diakel Powder Cracking Catalyst," a technical report of the Petroleum Research Division of The M. W. Kellogg Company, dated June 7, 1943, and is also described in Serial Number 829,215, filed July 24, 1959. Although the carrier materials used in the catalysts of this invention can possess a cracking activity which generally corresponds to a rating of at least about 12 on the Kellogg cracking activity scale, it is preferable that the cracking activity be at least 40 on the Kellogg cracking activity scale and most preferably between about 55 and 80 on the Kellogg cracking activity scale. These values relate to the cracking activity of the carrier itself in an unpromoted state and in the form in which it exists just prior to impregnation with the active metals.

To determine the Kellogg cracking activity of a catalyst, the catalyst is tested as a powder under the following cracking conditions:

| | |
|---|---|
| Feed | 35° A.P.I. Mid-Continent gas oil. |
| Catalyst temperature | 850±5° F. |
| Pressure | Atmospheric. |
| Catalyst charge | 710 grams. |
| Oil rate | 500±20 cubic centimeters per hour. |
| Velocity-inlet conditions | Approximately 0.1 feet per second. |
| Weight of oil per hour per weight of catalyst bed | 0.6±0.02. |
| Length of cracking test | 2 hours. |
| Blowdown nitrogen | 3 cubic feet per hour (0.2 linear feet per second). |

The oil feed used in the cracking test is a light Mid-Continent gas oil with the following typical inspections:

| | |
|---|---|
| Gravity—° A.P.I. | 34.8 |
| A.S.T.M. distillation: | |
| IBP—° F | 468 |
| 5% | 512 |
| 10% | 521 |
| 20% | 534 |
| 30% | 546 |
| 40% | 562 |
| 50% | 578 |
| 60% | 595 |
| 70% | 618 |
| 80% | 647 |
| 90% | 686 |
| 95% | 720 |
| E. P. | 748 |
| Aniline point—° F | 171 |
| Sulfur—Weight percent | 0.29 |

The allowable variations of oil feed inspections are as follows:

| | |
|---|---|
| Gravity—° A.P.I. | 35±1 |
| A.S.T.M. Distillation—° F.: | |
| 10% | 520±10 |
| 50% | 580±10 |
| 90% | 690±10 |
| E.P. | 750±25 |

The catalyst to be tested is heat treated at 850° F. for a two hour period before testing. This heat treatment is accomplished by filling a steel dish with 1100 grams of the catalyst under investigation and inserting it into a circulating air muffle furnace which has been preheated to 850±5° F. The catalyst should remain in the circulating air muffle furnace for two hours with the air stream flowing. The catalyst is then removed from the furnace.

The powdered catalyst test apparatus consists of a tubular reactor with a preheating coil and filter, a furnace, oil feed tank and pump, condenser, receiver and knockback trap, gas meter, and accessory equipment. In operating this test equipment, the reactor and preheating coil is mounted within the furnace and oil is pumped from the feed tank through transfer valves into the preheater coil. Oil vapors enter the reactor through a small orifice at the bottom of the fluid bed and flow upward. The cracked products leaving the bed pass into an enlarged settling zone, through a filter in the top of the reactor and through a condenser into a receiver situated in an ice water bath. Gases leaving the receiver pass through a knockback column cooled to −40° F. and then through a gas meter to a product gas holder.

The test reactor consists of a section of 1¼-inch pipe which is 4 feet, 9 inches in length, surmounted by a 6-inch section of 2-inch pipe containing a glass wool filter. A preheater coil consisting of 10 feet of ¼-inch O.D. tubing is wound on the outside of the 1¼-inch pipe and connects with a small orifice in the conical bottom attached to the latter.

In preparing for the test, nitrogen is passed through the preheater coil and the reactor at a rate of 2 cubic feet per hour which is approximately equivalent to the oil vapor rate during the run. The catalyst is then slowly charged into the reactor and the reactor is then secured within the heated furnace. The receiver in the recovery system is held at 32° F. with wet ice and the knockback traps are held at −40° F., with a 50–50 mixture of ethyl glycol and water cooled with Dry Ice.

A two hour cracking test is then conducted under the conditions outlined above employing a charge stock as specified. After this test is concluded, a nitrogen blowdown of 3 cubic feet per hour should be continued for 30 minutes. The liquid product is then drawn from the receiver into a chilled bottle, weighed and placed in an ice box. A few minutes should be allowed for any liquid holdup in the knockback to drain out. The reactor is then removed from the furnace and the catalyst is poured into a container and weighed.

At the completion of the cracking test, three products are available for analysis—total liquid, total gas and spent catalyst. The specific gravity of the liquid product expressed as ° A.P.I. should be taken at 35–40° F. according to A.S.T.M. procedure Serial Number D–287–39t. The distillation of the liquid test product should be carried out according to A.S.T.M. method D86–40 appearing in "Distillation of Gasoline, Naphtha, Kerosene and Similar Petroleum Products" (the distillation procedure to be employed for the gas oil charged to the test unit is A.S.T.M. test D158–4 appearing in "A.S.T.M. Standards for Petroleum Products and Lubricants"). The analysis of the gas products from the test unit which consist of carbon dioxide, hydrogen sulfide and air should be carried out according to the Orstat method. A gas density determination should be made by the Edwards balance method. A carbon analysis determination of the spent catalyst is made by burning the sample in a stream of oxygen, absorbing the $CO_2$ produced and determining the weight of $CO_2$ absorbed. It may be necessary to extract oil from the catalyst prior to the carbon analysis. This is accomplished by washing with 100–150 cubic centimeters alcohol followed by 100–150 cubic centimeters of 95 percent carbon tetrachloride. This is followed by drying in an oven at 375° F. to 400° F. overnight. After drying, the carbon content of the extracted catalyst is then determined. The amount of oil extracted is determined by evaporating the extract until no trace of carbon tetrachloride or alcohol is detected. The residue remaining is the oil removed from the catalyst.

A weight balance should be made. One hundred times the total weight of liquid product plus gas product plus carbon divided by the weight of oil feed is the weight balance in percent. For a test unit operation to be acceptable, the weight balance should be between 95 and 100 percent.

The Kellogg activity rating of the catalyst is expressed as volume percent conversion obtained under the standard test conditions. The activity rating can be calculated from the test results as follows:

$$\frac{\text{Total liquid products (grams)}}{\text{Liquid product specific gravity}} = \text{milliliters liquid product}$$

$$\frac{\text{Liquid product (milliliters)} \times \text{volume percent distillate plus loss at } 400°\text{ F.}}{100} = \text{milliliters gasoline}$$

$$\frac{\text{Total oil feed (grams)}}{\text{Feed specific gravity}} = \text{milliliters oil feed}$$

$$\frac{\text{Milliliters gasoline}}{\text{Milliliters oil feed}} \times 100 = \text{gasoline yield volume percent}$$

Milliliters liquid product—milliliters gasoline
= milliliters cycle oil $$\frac{\text{Milliliters cycle oil}}{\text{Milliliters oil feed}} \times 100 = \text{cycle oil volume percent}$$

100—volume percent cycle oil
= conversion volume percent
= Kellogg cracking activity in percent The lubricating oil hydrotreating process employs a deasphalted lubricating oil charge stock and is performed within a pressure range of 1500 to 10,000 pounds per square inch gauge. The process temperature can range from 650° to 825° F. Space velocities of 0.25 to 3.0 liquid volumes of hydrocarbon charge per hour per volume of catalyst can be employed. The hydrogen circulation rate can range from 2000 to 15,000 standard cubic feet of hydrogen per barrel. Between 400 and 1500 standard cubic feet of make-up hydrogen per barrel can be employed. The charge stock which is employed should first be deasphalted and have a Conradson carbon number below approximately 4.5 so that carbon formation during the hydrogenation process will be kept to a minimum, thereby holding to a minimum catalyst aging due to coke formation. Any deasphalted hydrocarbon oil which is heavier than the desired lubricating oil product, such as another lubricating oil, a residuum, or a crude oil can be charged to the hydrotreater.

*Example*

A lubricating oil hydrotreating reactor was operated initially with 100 percent hydrogen as make-up gas while maintaining the hydrogen content of the recycle gas stream at about 95 volume percent. The hydrotreater charge stock was an Ordovician deasphalted residuum. This charge and the hydrogen stream were passed downwardly over a sulfided catalyst containing 25 percent by weight of nickel and tungsten, in an atomic ratio of nickel to tungsten of 0.5:1.0, on a support designated as Triple A silica-alumina and manufactured by the American Cyanamid Company, comprising 75 percent by weight of silica and 25 percent by weight of alumina and having an activity for cracking corresponding to a rating of 74 on the Kellogg cracking activity scale. Operating conditions to produce a dewaxed lubricating oil product having a 120 viscosity index were a pressure of 3530 pounds per square inch gauge, a space velocity of 0.5 liquid volume of hydrocarbon per hour per volume of a catalyst and a gas circulation rate of 5000 standard cubic feet of hydrogen per barrel.

After a throughput of 1580 volumes of hydrocarbon per volume of catalyst the use of the 100 percent hydrogen make-up gas stream was discontinued and replaced by hydroreformer gas containing 90.6 percent hydrogen by volume. The hydrogen content of the recycle gas was thereupon reduced from 95 percent to 85 percent.

The hydroreformer supplying the hydrogen off-gas operated at an average temperature of 931° F., and an average pressure of 703 pounds per square inch gauge, a space velocity of 2.43 volumes hydrocarbon charge per volume of catalyst per hour and a 7.7 mole ratio of hydrogen to hydrocarbon. The feed analyzed 11 percent aromatics, 1 percent olefins, 45 percent naphthenes and 43 percent paraffins, on a volume basis. The catalyst contained 0.36 weight percent platinum, 0.24 weight percent chlorine, 0.58 weight percent fluorine, with the remainder primarily alumina. Chlorine was continuously added to the hydrocarbon charge. There were 699 standard carbon feet of hydrogen recovered per barrel of charge. The hydroreformer off-gas comprised 90.6 volume percent hydrogen, 4.1 volume percent methane and 5.3 volume percent ethane and heavier in addition to its halogen content. The presence of halogen in the hydroreformer off-gas is evidenced by the fact that subjecting the hydrotreater catalyst to this gas for a throughput interval of 420 volumes of hydrocarbon per volume of catalyst increased its chlorine content from 0.004 to 0.22 weight percent and its fluorine content from 0.02 to 0.03 weight percent.

The following table illustrates the beneficial effect in the hydrotreater achieved by the transition to hydroreformer off-gas hydrogen make-up.

| Throughput—Volume of Hydrocarbon Per Volume of Catalyst | Catalyst Temperature. ° F.—Required to Produce a 120 Viscosity Index Product |
|---|---|
| 50 | 782.5 |
| 180 | 784 |
| 280 | 784.5 |
| 360 | 786 |
| 500 | 787 |
| 570 | 788 |
| 770 | 789.5 |
| 930 | 791 |
| 1,130 | 793.5 |
| 1,290 | 795 |
| 1,450 | 797 |
| 1,580 | 798 |
|  | 100 percent hydrogen make-up gas stream replaced by hydroreformer off-gas stream |
| 1,900 | 796 |
| 2,000 | 796 |
| 2,200 | 796 |

It is noted that at a throughput of 2200 volumes of hydrocarbon per volume of catalyst the transition to a hydroreformer off-gas stream which was relatively lean in hydrogen resulted in a temperature at least 8° F. lower than the extrapolated temperature at this total throughput that would have been required to maintain a 120 viscosity index lubricating oil product if the original 100 percent hydrogen gas stream were continued. The use of a gas stream whose hydrogen content is decreased to this extent would ordinarily require a 3°–5° F. temperature increase to maintain a lubricating oil product of 120 viscosity index.

Various changes and modifications can be made without departing from the spirit of this invention or the scope thereof as defined in the following claims.

We claim:
1. A process for the preparation of lubricating oil comprising contacting a sulfided catalyst comprising a metal of the left hand column of group VI and a group VIII metal supported upon a carrier material having an activity for cracking corresponding to a rating of at least 12 on the Kellogg activity scale with a stream of liquid deasphalted hydrocarbon charge oil which is heavier than the lubricating oil to be produced in admixture with a stream of hydrogen under hydrotreating conditions of temperature, pressure and hydrogen-charge ratio, said hydrogen being produced in a hydroreforming process to which halogen and a water forming substance are continuously added, the amount of halogen added to the reforming process being at least sufficient for halogen promotion of both the hydroreforming process and the hydrotreating process, recovering an effluent from said hydrotreatment and separating a high quality lubricating oil fraction from said effluent.

2. Claim 1 wherein said left hand column group VI metal is tungsten, said group VIII metal is nickel and said halogen is chlorine.

3. A process wherein a hydroreformer and a lubricating oil hydrotreater are operated interdependently comprising adding halogen to a desulfurized hydroreformer hydrocarbon charge in an amount sufficient for activation of the hydroreformer catalyst and the hydrotreater catalyst, adding to the hydroreformer hydrocarbon charge a substance which forms water under the conditions of the hydroreformer, contacting said hydroreformer hydrocarbon charge, halogen and water forming substance and hydrogen with a hydroreformer catalyst, recovering an effluent from said hydroreformer and separating a gaseous hydrogen containing stream from said effluent, adjusting the rate of addition of said water forming substance to regulate the halogen content of said hydrogen containing stream, contacting at least a portion of said hydrogen containing stream together with a lubricating oil hydrotreater hydrocarbon charge with a hydrotreater catalyst comprising a sulfided metal of the left hand column of group VI and a sulfided group VIII metal supported upon a carrier material having an activity for cracking corresponding to a rating of at least 12 on the Kellogg activity scale under hydrotreating conditions of temperature and pressure, recovering an effluent from said hydrotreater and separating a lubricating oil fraction from said effluent.

4. Claim 3 wherein said group VI metal is tungsten, said group VIII metal is nickel and said halogen is chlorine.

5. A process wherein a hydroreformer and a lubricating oil hydrotreater are operated interdependently comprising adding halogen to a desulfurized hydroreformer hydrocarbon charge containing at least 40 percent by volume of cyclic compounds in an amount sufficient for activation of the hydroreformer catalyst and the hydrotreater catalyst, adding to the hydroreformer hydrocarbon charge a substance which forms water under the conditions of the hydroreformer, contacting said hydroreformer hydrocarbon charge, halogen and water forming substance and hydrogen with a hydroreformer catalyst, recovering an effluent from said hydroreformer and separating a gaseous hydrogen containing stream from said effluent, adjusting the rate of addition of said water forming substance to regulate the halogen content of said hydrogen containing stream, contacting at least a portion of said hydrogen containing stream together with a lubricating oil hydrotreater hydrocarbon charge with a hydrotreater catalyst comprising a sulfided metal of the left hand column of group VI and a sulfided group VIII metal supported upon a carrier material having an activity for cracking corresponding to a rating of at least 40 on the Kellogg activity scale under hydrotreating conditions of temperature and pressure, recovering an effluent from said hydrotreater and separating a lubricating oil fraction from said effluent.

6. A process wherein a hydroreformer and a lubricating oil hydrotreater are operated interdependently comprising adding halogen to a desulfurized hydroreformer hydrocarbon charge containing at least 40 percent by volume of cyclic compounds in an amount sufficient for activation of the hydroreformer catalyst and the hydrotreater catalyst, adding to the hydroreformer hydrocarbon charge a substance which forms water under the conditions of the hydroreformer, contacting said hydroreformer hydrocarbon charge, halogen and water forming substance and hydrogen with a hydroreformer catalyst, recovering an effluent from said hydroreformer and separating a gaseous hydrogen containing stream from said effluent, adjusting the rate of addition of said water forming substance to regulate the halogen content of said hydrogen containing stream, contacting at least a portion of said hydrogen containing stream together with a lubricating oil hydrotreater hydrocarbon charge with a hydrotreater catalyst comprising a sulfided metal of the left hand column of group VI and a sulfided group VIII metal supported upon a carrier material having an activity for cracking corresponding to a rating of at least 40 on the Kellogg activity scale under hydro-treating conditions of temperature and pressure, recovering an effluent from said hydrotreater and separating a lubricating oil fraction from said effluent and a fraction boiling below the lubricating oil range and containing at least 40 percent by volume of cyclics, and recycling said fraction boiling below the lubricating oil range to the hydroreformer hydrocarbon charge stream.

References Cited in the file of this patent
UNITED STATES PATENTS

| | | |
|---|---|---|
| 2,642,383 | Berger et al. | June 16, 1953 |
| 2,735,877 | Mills et al. | Feb. 21, 1956 |
| 2,899,378 | Herder | Aug. 11, 1959 |
| 2,902,426 | Heinemann et al. | Sept. 1, 1959 |
| 2,914,457 | Beavon | Nov. 24, 1959 |
| 2,916,440 | Hogin et al. | Dec. 8, 1959 |
| 2,953,521 | Bowles | Sept. 20, 1960 |

UNITED STATES PATENT OFFICE
CERTIFICATE OF CORRECTION

Patent No. 3,062,735                                              November 6, 1962

Robert E. Donaldson et al.

It is hereby certified that error appears in the above numbered patent requiring correction and that the said Letters Patent should read as corrected below.

Column 2, line 3, for "componds" read -- compounds --; line 39, after "inorganic" insert -- halogen --; same column 2, line 56, for "difficulty" read -- difficultly --; column 8, line 51, for "Orstat" read -- Orsat --; column 10, line 9, for "carbon" read -- cubic --.

Signed and sealed this 14th day of May 1963.

(SEAL)
Attest:

ERNEST W. SWIDER
Attesting Officer

DAVID L. LADD
Commissioner of Patents